United States Patent [19]

Peube et al.

[11] Patent Number: 5,655,367
[45] Date of Patent: Aug. 12, 1997

[54] INLET OR EXHAUST LINE FOR A RECIPROCATING MACHINE

[75] Inventors: Jean-Laurent Peube, Naintre; Jacky Tartarin; Janick Laumonier, both of Poitiers, all of France

[73] Assignee: Centre National De La Recherche Scientifique (CNRS), Paris, France

[21] Appl. No.: 362,474

[22] PCT Filed: Jul. 7, 1993

[86] PCT No.: PCT/FR93/00703

§ 371 Date: Jan. 27, 1995

§ 102(e) Date: Jan. 27, 1995

[87] PCT Pub. No.: WO94/01659

PCT Pub. Date: Jan. 20, 1994

[30] Foreign Application Priority Data

Jul. 7, 1992 [FR] France .................. 92 08362

[51] Int. Cl.[6] ............................................. F01N 7/00
[52] U.S. Cl. ..................... 60/324; 73/118.1; 181/226; 181/252; 181/277
[58] Field of Search .......................... 60/324, 312, 292; 181/226, 256, 252, 254, 277, 278; 73/118.1

[56] References Cited

U.S. PATENT DOCUMENTS

| | | | |
|---|---|---|---|
| 3,166,895 | 1/1965 | Slayter | 60/304 |
| 3,234,924 | 2/1966 | May | 60/324 |
| 3,523,418 | 8/1970 | Marsee | 60/324 |
| 5,372,109 | 12/1994 | Thompson | 60/324 |

FOREIGN PATENT DOCUMENTS

| | | |
|---|---|---|
| 2613089 | 9/1988 | France . |
| 60-162007 | 8/1985 | Japan . |
| 1-182568 | 7/1989 | Japan . |
| 1559996 | 1/1980 | United Kingdom . |

OTHER PUBLICATIONS

Patent Abstracts of Japan, vol. 9, No. 330 (M-442)(2053) Dec. 25, 1985.

Patent Abstracts of Japan, vol. 13, No. 469 (M-883), Oct. 24, 1989.

Primary Examiner—Douglas Hart
Attorney, Agent, or Firm—Oliff & Berridge

[57] ABSTRACT

An inlet or exhaust line for a reciprocating machine attenuates the sound level of the machine while being simple and economical to produce. A sensor measures the instantaneous flow rate of gases passing through the line while a restriction device variably restricts the cross-section of the line as a function of the instantaneous flow rate measured by the sensor. Material for absorbing acoustic energy covers the internal wall of the line.

8 Claims, 3 Drawing Sheets

INLET OR EXHAUST LINE FOR A RECIPROCATING MACHINE

This application has been filed under 35 USC 371 for the invention described and claimed in international application number PCT/FR93/00703, filed Jul. 7, 1993.

The present invention relates to an inlet or exhaust line for a reciprocating machine.

According to the invention, by reciprocating machine is meant any device creating flow pulsations either in an induced manner or in a spontaneous manner, such as, for example, a combustion engine, a compressor or a heat pump.

It is known that gas inlet or exhaust pulsations of a reciprocating machine are a major source of noise, especially low-frequency noise. The same is true for the outputs of all reciprocating machines (compressors, vacuum pumps, heat pumps etc) and for the inlets of these machines.

These pulsations have very high energies at precise frequencies related to the cycle of the machine, but are very weak for different intermediate frequencies.

In fact, acoustic analysis of this noise reveals a spectrum having discrete lines of very high energy.

In order to decrease the level of noise generated by the pulsations of a combustion engine for example, exhaust lines fitted with silencers are used.

However, although these silencers enable the low-frequency pulsations of the exhaust gases to be attenuated moderately, they simultaneously introduce into the exhaust line singularities which are manifested by fluctuations and turbulence in the flow, and therefore by noise possessing medium and high frequencies.

In addition, when an exhaust line is installed on a motor vehicle, its geometrical singularities are all the more important as it has to be fitted into the space available beneath the vehicle. Thus it is frequently observed in exhaust lines that the internal cross-section of the pipe varies several times from one end of the exhaust line to the other, the exhaust line moreover including many baffles and other obstacles likely to generate noise.

As a result, the usual exhaust lines, which are constituted by tubular pipes connecting silencers, are relatively bulky and are the source of additional blowing noise; furthermore, they lead to quite appreciable pressure drops.

Devices are also known for reducing the noise of an exhaust line which generate, in the direction of the exhaust line, an acoustic wave which is as strictly as possible equal to that emitted by the latter.

However, such devices are very bulky, require very sensitive electronic and acoustic equipment and, consequently, are not very reliable under the particularly demanding use conditions of a motor-vehicle exhaust line.

Furthermore, from an energy standpoint, such devices are not very satisfactory insofar as they in no way seek to decrease the energy dedicated to the generation of the noise but, on the contrary, expend at least an equivalent amount of additional energy.

Finally, these devices employ techniques for which the design of an exhaust line, fitted to such an engine and intended to be installed on such equipment, requires complex simulations of the behaviour of the fluid within the exhaust line, bearing in mind the elements of which it will be composed, it being furthermore possible for these to be mutually interfering.

It has also already been tried to damp the flow pulsations of a fluid in a pipe with the aid of variable-geometry devices which tend to modify the resonant frequencies in the pipe by adapting the action of a restriction means to an overall measure of the flow rate of the fluid in the pipe and not to the specific pulsations of the fluid.

The present invention aims to provide a novel inlet or exhaust line which does not have the drawbacks encountered in the known technique and which enables, in a substantial way, especially the sound level of a combustion engine to be attenuated, while at the same time being simple and economical to produce.

In addition, the subject of the present invention turns out, due to its structure, to be remarkably suited to the various reciprocating machines and to the various geometrical shapes that can be imposed on it.

The subject of the present invention is an inlet or exhaust line, especially for a reciprocating machine, characterized in that it is constituted by a gas flow pipe, the said pipe being fitted with at least one sensor for measuring a physical quantity characteristic of the instantaneous flow rate of the gases, the exhaust line furthermore including at least one device for variably restricting its cross-section for passage of the gases, which instantaneously varies the energy loss of the gases flowing in the pipe as a function of the quantity measured by the sensor, in order principally to reduce the low-frequency pulsations of the gases and the low-frequency components of the noise which result from its very presence in the gas duct, whereas the internal wall of the pipe is lined with a material absorbing the acoustic energy in order principally to attenuate the high-frequency pulsations of the gases, as well as the high-frequency components of the noise generated in the pipe by the restriction device.

Thus, the present invention combines the advantages of a variable restriction device, which actively controls the flow pulsations of a gas, with those of the lining of the walls of a pipe.

In fact, the inventors have noticed that these two devices, joined together in one and the same inlet or exhaust line, enable noise attenuations to be obtained which are better than those obtained by using these devices separately.

The complementarity of the variable restriction device and of the lining of the internal wall of the pipe stems from the fact that the variable restriction device, which constitutes an obstacle placed in the gas duct, is itself a noise generator.

Now, the sound level of this parasitic noise is limited to medium or high frequencies on account of the fact that, by construction, the variable restriction device automatically eliminates the low-frequency pulsations of the gases, including those for which it could be the source.

In contrast, the lining of the walls is relatively ineffective for attenuating the low-frequency noise but is particularly adapted to the attenuation of high-frequency noise.

Consequently, the lining of the walls is appropriate for eliminating the high-frequency noise of the gases, as well as the high-frequency components of the noise generated by the active control device. Another role of the lining is to avoid any significant reflection of the acoustic waves within the pipe.

In the case of a combustion engine, an exhaust line according to the invention may dispense with silencers of the prior art.

According to one preferred embodiment of the invention, the device for restricting the cross-section of the pipe acts on that part of the pipe remote from the machine generating the pulsations.

In fact, it is preferable to actively control the pulsations of the gases as far as possible from the reciprocating machine, that is to say by maintaining a large volume of fluid upstream of the restriction device in order to avoid adversely affecting the energy efficiency of the said machine.

In another embodiment, the pipe portion located upstream of the restriction device possesses a diameter greater than that of the pipe portion which contains the latter. Thus, the pipe has a relatively large volume, as in the preceding embodiment, thereby limiting the back-pressure generated during the restriction.

This arrangement may be useful in the case where such a line is to be installed in a confined place, for example at the outlet of an engine of certain vehicles or industrial engines.

An inlet or exhaust line according to the invention has, especially, the advantage of occupying only a very small volume in comparison with the exhaust lines of the prior art.

This leads to a mass reduction since, in the absence of silencers, the weight of the inlet or exhaust line substantially comes down to the weight of the pipe.

These advantages are important for the motor-vehicle industry since the housing of an exhaust line according to the invention and its attachment beneath a vehicle no longer raise the size and mass problems encountered hitherto.

Being internally lined, the inlet or exhaust line according to the invention furthermore has the following two advantages:

the risk of the wall of the pipe going into resonance with the gas pulsations is eliminated;

the radiated noise is also virtually zero since, on the one hand, the outer wall of the inlet or exhaust line is no longer subjected to the gas vibrations and, on the other hand, the emissive surface of the inlet or exhaust line, that is to say its overall outer surface, is considerably reduced compared to that of a conventional exhaust line which is longer and includes silencers of large external diameter.

According to a particular embodiment of the invention, the inlet or exhaust line includes a means for regulating the restriction device which causes attenuation of a preferential range of gas pulsation frequencies enabling a particular sonority of the line to be obtained.

In this manner, it is possible to tune the "timbre" of the inlet or exhaust line as a function of the noise that is desired to be obtained.

For example, on a motor vehicle, the constructor or the purchaser of the vehicle may desire the exhaust line to emit either a noise with a sporty connotation or a more attenuated noise.

With the same idea in mind, an industrial installation may emit a noise with a disagreeable tone resulting from frequency combinations which, even at quite a low sound level, may be uncomfortable for the human ear.

By virtue of the inlet or exhaust line according to the invention, it is possible to choose the frequencies to be attenuated by suitably regulating the restriction device.

Moreover, according to one particular embodiment of the invention, the inlet or exhaust line equips a motor vehicle and its restriction device incorporates the speed of movement of the vehicle as an additional parameter in order to attenuate as much as possible the exhaust noise of the engine when the vehicle is moving at low speed and in order to minimize the pressure drops of the exhaust gases so as to improve the performance of the combustion engine when the vehicle is moving at high speed.

It is understood that this embodiment is particularly advantageous for adapting the noise level of a vehicle used both in town, and therefore at low speed, and on a main road or motorway, that is to say at high speed.

According to another embodiment of the invention, the inlet or exhaust line includes an electronic device for analysing the signal output by the measurement sensor with a view to detecting and possibly diagnosing a malfunction of the reciprocating machine.

In order to do this, it suffices for the said analysing device to compare the various periods of the measured acoustic signal with reference signals.

For example, for a four-cylinder combustion engine, the perceived acoustic signal has a cycle of four periods. An irregularity in one of these periods compared to the other three may reveal a malfunction of one of the four cylinders.

For the purpose of making the invention easier to understand, two embodiments of it will be described, these being given by way of example and in no way having a limiting character, with reference to the appended drawing in which.

Figure 1:
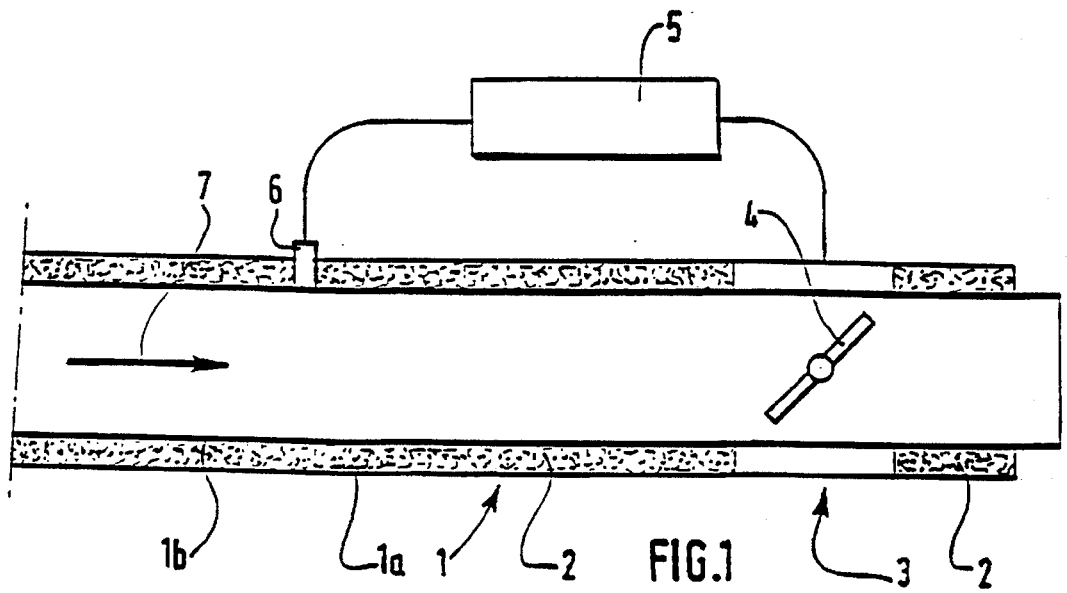
FIG. 1 depicts an exhaust line according to a first embodiment of the invention.

The wall 1a of the pipe 1 is made of metal and has a continuous smooth surface.

Inside the pipe, a reticulated material 1b having wide meshes, such as a metal meshing, keeps a lining 2 pressed against the wall 1a of the pipe 1.

By way of example, an exhaust line according to the invention has been produced which possesses an external diameter of 95 mm and a total length of 0.60 m and which is internally lined with rock wool with a thickness of 25 mm, this leaving an internal cross-section for passage of the exhaust gases of 45 mm in diameter.

The lining 2 is present from end to end of the pipe, save in the vicinity of a restriction device 3, the shutter 4 of which may be been in the half-closed position.

A control member 5 controls the restriction device 3 as a function of the signal which it receives from a sensor 6 housed in the thickness of the pipe 1.

The operation of such a restriction device is described in the document FR-A-2 613 089.

The pulsed gases output by the combustion engine flow into the exhaust line, as represented by the arrow 7.

It has been found that, because of its general shape, the exhaust line according to the invention takes up little room and that it has a radiating surface area which is substantially reduced.

Furthermore, this exhaust line is by nature adaptable to any type of engine, the matching of the restriction device being simply based on the feedback-control law which it obeys.

From the industrial standpoint, this constitutes an advantage since the manufacturer of exhaust lines is not obliged to design and manufacture an exhaust line for each engine existing.

Figure 2:
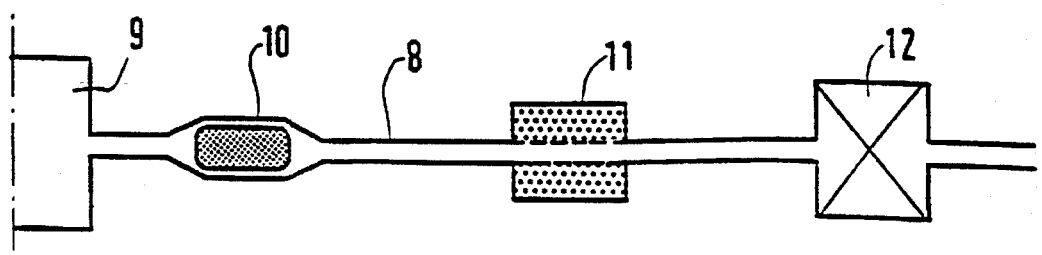
FIG. 2 depicts an exhaust line of the prior art.

In FIG. 2, an exhaust line of the prior art has been depicted diagrammatically. Such an exhaust line includes a pipe 8 45 mm in diameter mounted on the exhaust-gas outlet of an engine 9.

A catalytic converter 10, an expansion pot 11 and a silencer 12 are successively arranged on the pipe 8 in the direction of passage of the exhaust gases.

Figure 3:
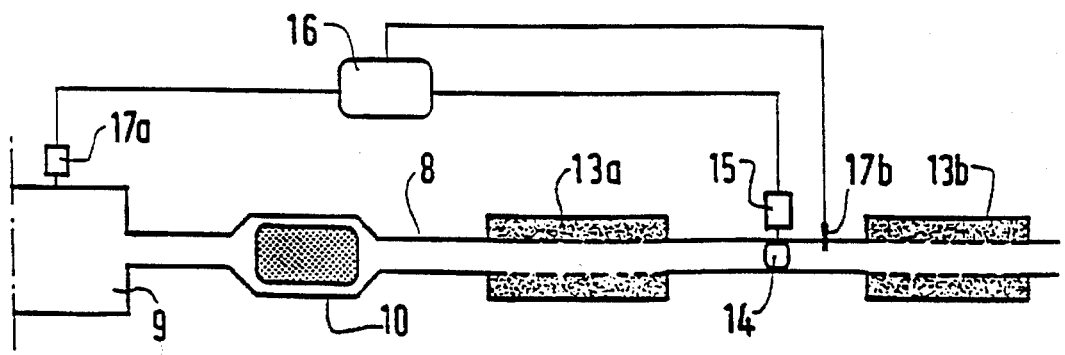
FIG. 3 depicts an exhaust line according to a second embodiment of the invention.

An exhaust line according to a second embodiment of the invention has been depicted in FIG. 3. This exhaust line has the same length as that which has just been described.

However, the overall size of the exhaust line of FIG. 3 is less than that of the exhaust line of FIG. 2 because of the fact that the external diameters of the elements of which it is composed are smaller.

Beyond the catalytic converter 10, which fulfils the same function as previously, the expansion pot 11 and the silencer 12 of the prior art have been replaced in this case by two lengths 13a and 13b provided with an absorbent material on their internal walls, these lengths being located on either side of a variable restriction device constituted by a valve 14 of the throttle-valve type which is operated by an actuator 15, itself controlled by an electronic device 16 which analyses the data output by two sensors 17a and 17b placed respectively on the engine 9 and on the pipe 8, downstream of the valve 14.

The first length 13a provided with an absorbent material consists of a pipe 0.8 m in length, internally lined with rock wool 20 mm in thickness which is held in place by a meshing or a perforated metal sheet of cylindrical shape and 45 mm in diameter.

The second length 13b equipped with an absorbent material has an identical structure but has a length of 0.6 m.

Figure 4:
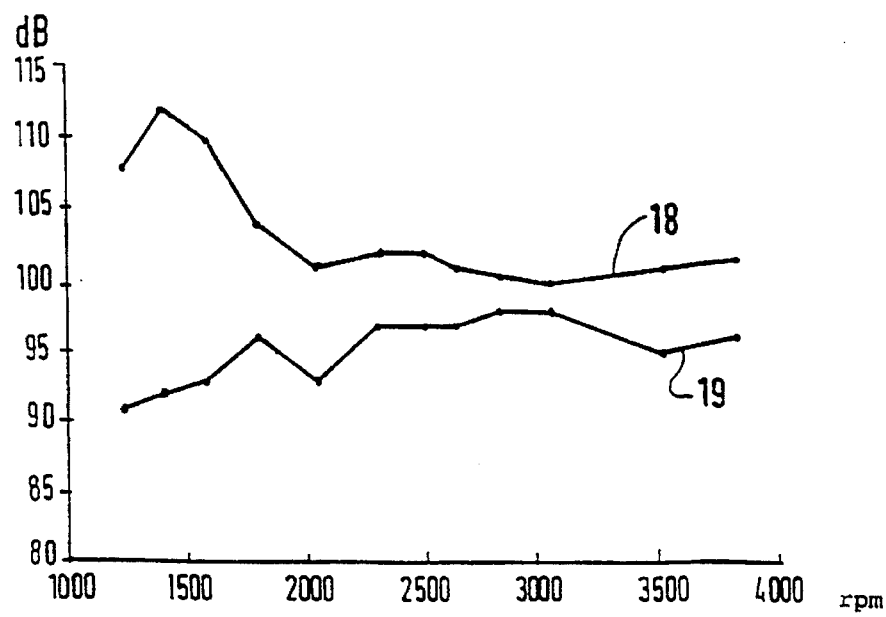
FIGS. 4 to 6 are graphs illustrating the differences in noise-reduction effectiveness between the exhaust lines of FIGS. 2 and 3.
Figure 5:
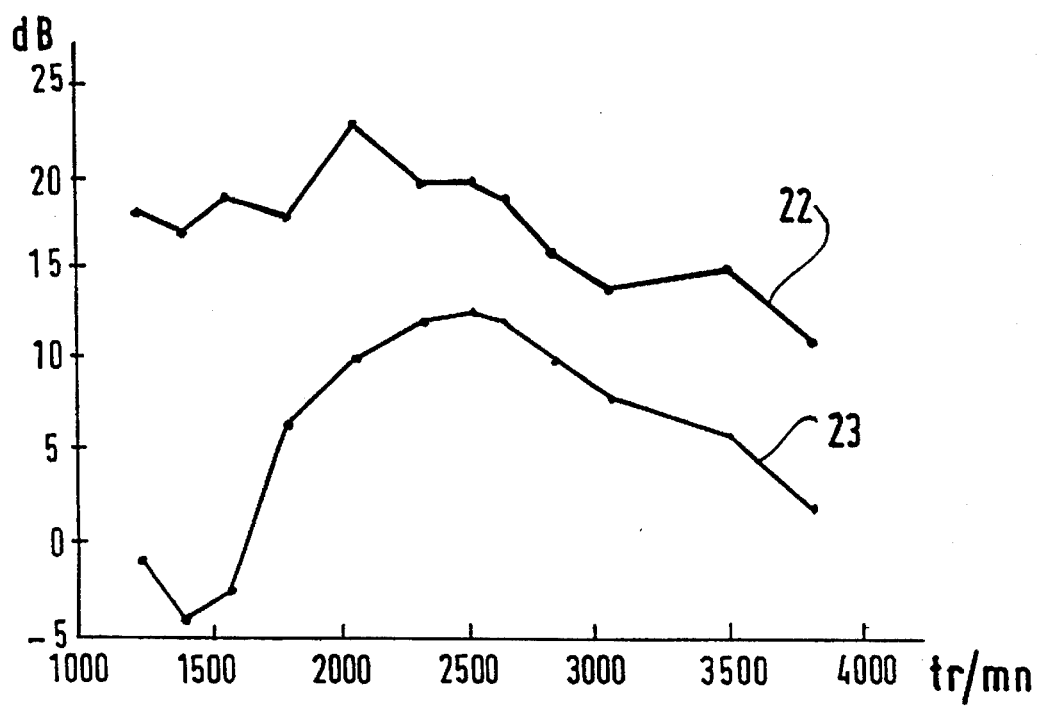
Figure 6:
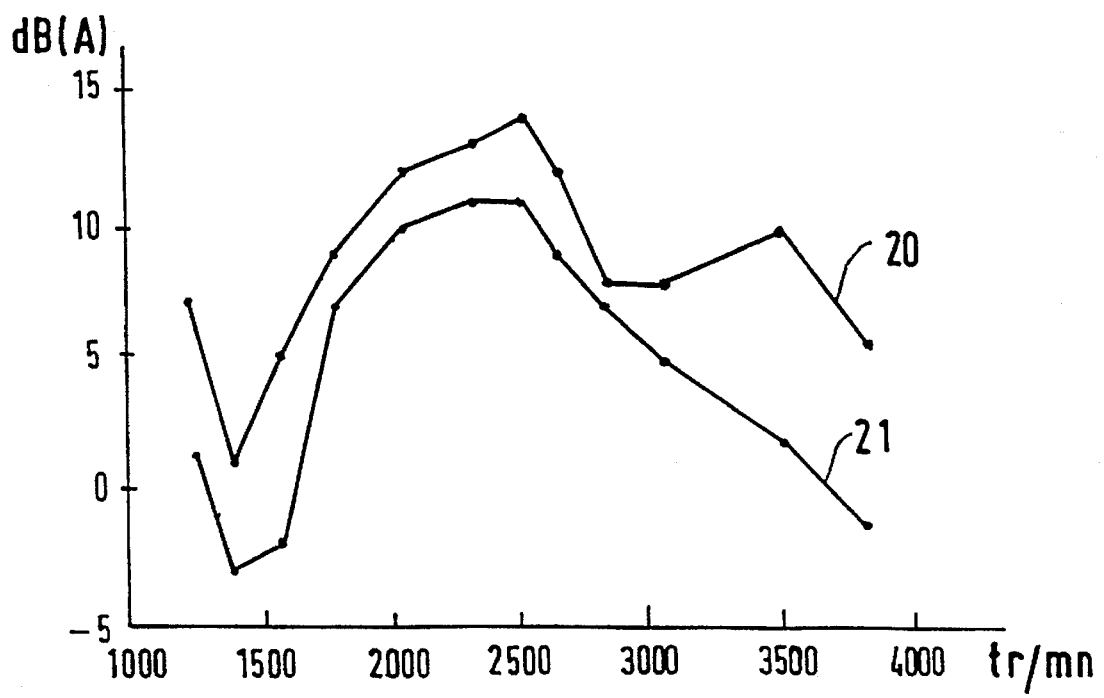

The two exhaust lines of FIGS. 2 and 3 formed the subject of comparative tests, the results of which appear in FIGS. 4 to 6.

The sound levels of the noise of the exhaust lines were measured identically for each line, by placing a previously calibrated microphone 10 cm from the plane of the outlet opening of each exhaust line and at 45° to the axis of the latter.

The sound levels measured in a 20 to 20,000 Hz band, for speeds of the engine 9 varying from 1200 to 3800 revolutions per minute, gave the two curves of FIG. 4, the upper curve 18 corresponding to the exhaust line of FIG. 2 and the lower curve 19 corresponding to the exhaust line of FIG. 3.

It is clearly seen in this FIG. 4 that the exhaust line of the prior art is substantially noisier than the exhaust line according to the invention, whatever the speed of the engine 9.

Likewise, the performance of the two lines of FIGS. 2 and 3 were compared using the technique called insertion-loss measurement: for each exhaust line, a measurement was made in succession of the noise emitted by the exhaust line fitted with the element whose effectiveness it is desired to measure, and then of the noise emitted by the said exhaust line whose element in question was replaced by a length of pipe equal in length. The differences between the sound levels measured without the noise-reduction element and those measured with the said element were then plotted in the graphs of FIGS. 5 and 6.

Curves 20 and 22 correspond to the exhaust line of FIG. 3, while curves 21 and 23 correspond to the exhaust line of FIG. 2.

FIG. 5 depicts the raw measurement expressed in decibels. In this figure, it is seen that the effectiveness of the exhaust line according to the invention is much superior to that of the exhaust line of the prior art.

In order to take into account the sensitivity of the human ear, the raw measurements of FIG. 5 were corrected using a known weighting technique, resulting in the curves depicted in FIG. 6 in which the unit of sound level is the decibel A (dB(A)).

In this FIG. 6, it is apparent that the difference in effectiveness between the exhaust line according to the invention and that of the prior art is great for all operating speeds of the engine 9.

Figure 7:
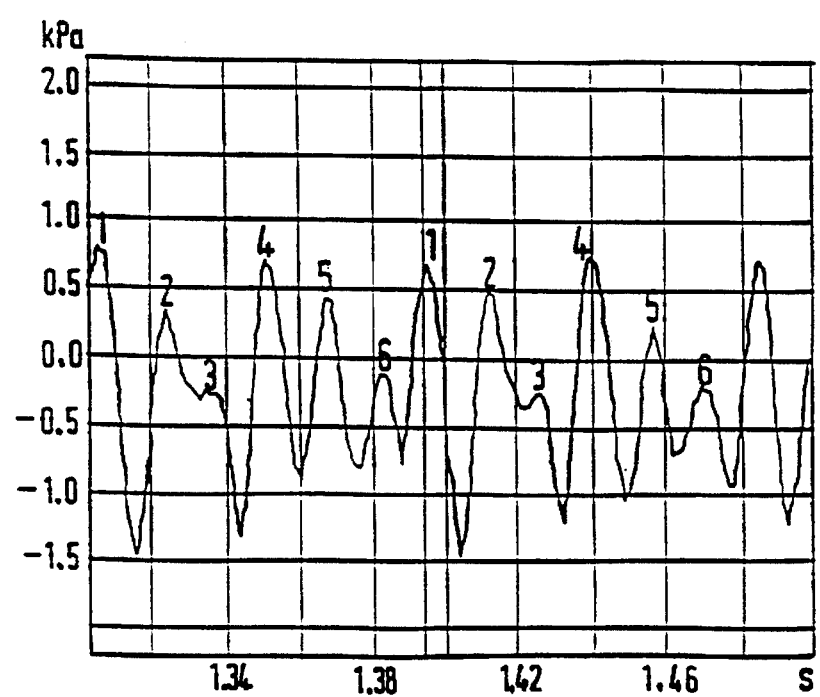
FIG. 7 depicts a pressure measurement taken on an exhaust line according to the invention.

FIG. 7 depicts a pressure measurement taken on the exhaust line of FIG. 3, by virtue of the sensor 17b located immediately downstream of the valve 14.

This pressure measurement corresponds to the operation of a 6-cylinder in-line engine running at a speed of 1300 revolutions per minute.

Each peak in the curve corresponds to the opening of the exhaust valves of one cylinder.

The curve of FIG. 7 includes two cycles, each peak being denoted by a number from 1 to 6, corresponding to the cylinder number in question.

In the present case, it may be deduced from this pressure measurement that the cylinder 3 has a highly defective exhaust valve since there is no pressure drop between the peaks 2 and 3, which corresponds to an exhaust leakage at the moment of the pressure rise in the cylinder 3.

It may also be noticed that the cylinder 6 has a combustion defect since the pressure of the exhaust gases output by this cylinder is appreciably less than that of the cylinders 1 to 5.

Although such a method of monitoring the correct operation of a combustion engine is known, the exhaust line according to the invention enables this real-time method to be implemented when using the engine.

It is quite obvious that the embodiment which has just been described has no limiting character and that it may receive any desirable modifications without departing thereby from the scope of the invention.

In a variant, a double wall could, in particular, be provided in order to reduce the emissive capacity of the pipe substantially further.

Besides its application to any inlet or outlet nozzle of a reciprocating machine, the inlet or exhaust line according to the invention may be inserted into a pipe for gas or into a pipe for liquid or for a mixture of both these phases, in which the inlet or exhaust line makes it possible to attenuate the noise and the fluctuations in pressure and in flow rate which are generated by any more or less fortuitous or periodic pressure wave propagating therein.

We claim:

1. An exhaust line, especially for a reciprocating machine, comprising;

a gas flow pipe fitted with at least one measurement sensor for measuring a physical quantity characteristic of the instantaneous flow rate of the gases;

the exhaust line further including at least one restriction device for variably restricting a cross-section of the exhaust line and controlling passage of the gases, said at least one restriction device instantaneously varying energy loss of the gases flowing in the pipe as a function of the quantity measured by the at least one measurement sensor in order to reduce low-frequency pulsations of the gases and low-frequency components of noise which results from the presence of low frequency pulsations of gases in the exhaust line;

an internal wall of the gas flow pipe lined with a material capable of absorbing the low frequency components of noise in order to attenuate high-frequency pulsations of the gases, as well as high-frequency components of the noise generated in the pipe by the at least one restriction device;

the exhaust line further including an electronic device for analyzing the signal output by the at least one measurement sensor with a view to detecting and optionally diagnosing a malfunction of the reciprocating machine.

2. An exhaust line according to claim 1, wherein the at least one restriction device for restricting the cross-section of the pipe acts on a part of the pipe remote from the reciprocating machine.

3. An exhaust line according to claim 1, wherein a part of the pipe located upstream of the at least one restriction device possesses a diameter greater than that of a part of the pipe which contains the at least one restriction device.

4. An exhaust line according to claim 1, including a means for regulating the at least one restriction device which causes attenuation of a preferential range of gas pulsation frequencies enabling a particular sonority of the exhaust line to be obtained.

5. An exhaust line, especially for a reciprocating machine, comprising;

a gas flow pipe fitted with at least one measurement sensor for measuring a physical quantity characteristic of the instantaneous flow rate of the gases;

the exhaust line further including at least one restriction device for variably restricting a cross-section of the exhaust line and controlling passage of the gases, said at least one restriction device instantaneously varying energy loss of the gases flowing in the pipe as a function of the quantity measured by the at least one measurement sensor, in order to reduce low-frequency pulsations of the gases and low-frequency components of noise which results from the presence of low frequency pulsation of gases in the exhaust line;

an internal wall of the gas flow pipe lined with a material capable of absorbing the low frequency component of noise in order to attenuate high-frequency pulsations of the gases, as well as high-frequency components of the noise generated in the pipe by the restriction device;

the exhaust line equipping a motor vehicle, and the at least one restriction device incorporating the speed of movement of the vehicle as an additional parameter in order to attenuate as much as possible the exhaust noise of the engine when the vehicle is moving at low speed and in order to minimize the pressure drops of the exhaust gases, so as to improve the performance of the combustion engine when the vehicle is moving at high speed.

6. An exhaust line according to claim 5, wherein the at least one restriction device for restricting the cross-section of the pipe acts on a part of the pipe remote from the reciprocating machine.

7. An exhaust line according to claim 5, wherein a part of the gas flow pipe located upstream of the at least one restriction device possesses a diameter greater than that of a part of the pipe which contains the at least one restriction device.

8. An exhaust line according to claim 5, including a means for regulating the at least one restriction device which causes attenuation of a preferential range of gas pulsation frequencies enabling a particular sonority of the exhaust line to be obtained.

* * * * *